June 29, 1965   J. L. BUCHANAN ETAL   3,192,468
DIRECT CURRENT CONTROLLED RECTIFIER SYSTEM
Filed Nov. 15, 1962   2 Sheets-Sheet 1

INVENTORS
JAMES L. BUCHANAN
JOHN R. SWANSON
WILLIAM B. ZELINA

BY *Joseph V. Claeys*

THEIR ATTORNEY

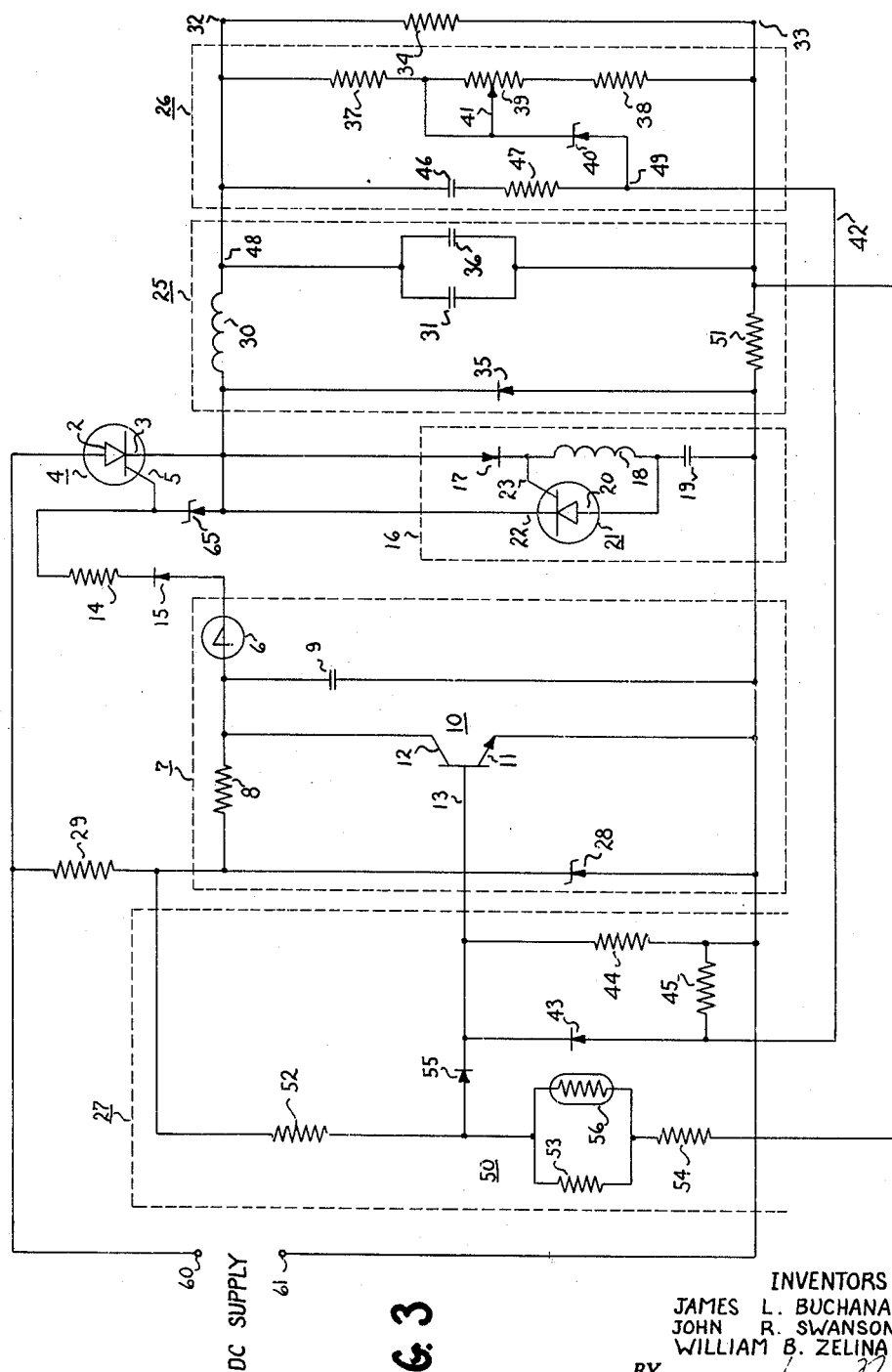

3,192,468
DIRECT CURRENT CONTROLLED RECTIFIER SYSTEM
James L. Buchanan, John R. Swanson, and William B. Zelina, Erie, Pa., assignors to General Electric Company, a corporation of New York
Filed Nov. 15, 1962, Ser. No. 237,796
10 Claims. (Cl. 323—22)

This invention relates to controlled rectifier systems and more particularly to such systems for operation from a direct current voltage supply, and to new and improved control and commutating circuits therefor. While this invention is subject to a wide range of application, it is particularly useful for converting a direct current voltage of one magnitude to a direct current voltage of another, regulated magnitude.

Controlled rectifier systems which perform a similar direct current conversion function are known in the art and various such systems may be found, for example, in "The Silicon Controlled Rectifier Manual," first edition published in 1960 by the General Electric Company. One general system of this type is described therein as "a resonant load capacitor commutated inverter"; this type system being characterized by one or more capacitors which are alternately charged and discharged into the load circuit. The load energy is supplied from the resonant reactive elements which also turn off or "commutate" the controlled rectifier. In such systems the "on-time" of the controlled rectifier is dependent upon such factors as supply voltage, type of load and load current. Although it has been known to employ a controlled rectifier in the commutation circuit to discharge the resonant load capacitor into the load, separate control and timing circuits were required to initiate conduction of such controlled rectifier which contributed to an increase in complexity. Further, in such prior art systems the separate timing and control circuits made it extremely difficult to achieve maximum commutation system capacity. A still further disadvantage of such prior art systems was the possibility of the application of a gating pulse to the controlled rectifier during commutation and before forwarded voltage is again applied thereto.

It is an object of this invention, therefore, to provide a controlled rectifier system for operation from a direct current voltage supply which substantially avoids one or more of the disadvantages of the prior art systems and which is more reliable.

It is another object of this invention to provide a controlled rectifier system for operation from a direct current supply voltage wherein the "on-time" of the controlled rectifier thereof is independent of supply voltage, type of load or load current.

It is a further object of this invention to provide a direct current controlled rectifier system providing for maximum commutation system capacity.

Briefly stated, in accordance with one aspect of this invention, we provide a direct current controlled rectifier system comprising a solid-state controlled rectifier having an anode, a cathode and a control electrode and means for connecting the anode and cathode thereof in series with a load circuit and a source of direct current voltage. Control circuit means are provided comprising a variable frequency relaxation oscillator including a multi-layer semiconductor diode device, which device is operative to apply a gating signal directly to the control electrode to initiate conduction in the controlled rectifier. The system further includes a commutation circuit means shunting the load circuit. The commutation circuit means includes a resonant load capacitance, a second solid-state controlled rectifier for discharging the capacitance into the load, and means for applying the energy stored in the resonant load capacitance to the control electrode of the second controlled rectifier to initiate conduction therein a fixed time after the initiation of conduction in the first controlled rectifier.

In further accord with this invention we provide a voltage interlocking means for simultaneously applying the energy of the resonant load capacitance to the cathode of the first controlled rectifier and the multilayer diode device operative to prevent application of a gating signal to the control electrode of the first controlled rectifier until the resonant load capacitance has discharged to a predetermined level thereby providing for maximum commutation system capacity.

The novel features believed characteristic of our invention are set forth with particularity in the appended claims. The invention itself, however, both as to its organization and mode of operation, together with further objects and advantages thereof, may best be understood by reference to the following description taken in conjunction with the accompanying drawing in which:

Figure 1:
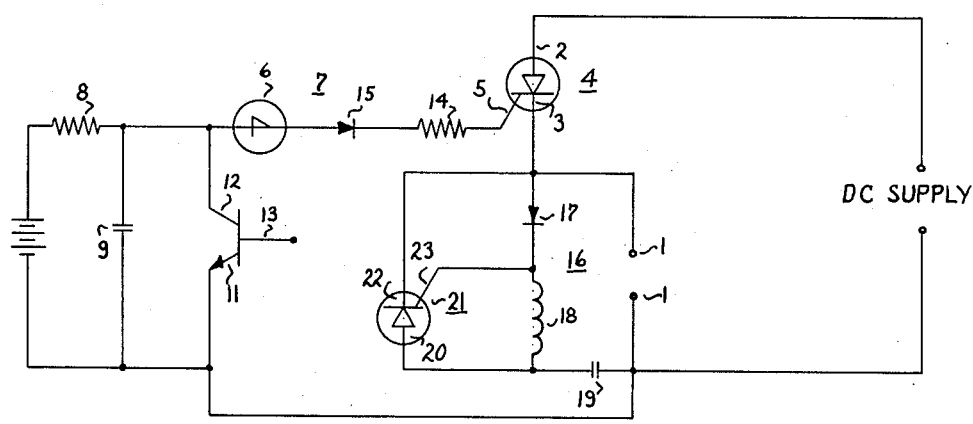
FIG. 1 is a schematic circuit diagram of a basic direct current controlled rectifier system in accordance with this invention.

FIG. 1 shows a schematic circuit diagram of a basic direct current controlled rectifier system in accordance with one aspect of this invention. Power from a source of direct current is applied in series with a load circuit, adapted for connection to the terminals 1—1 and the anode 2 and cathode 3 of a solid-state controlled rectifier 4, which conducts when a suitable positive voltage is applied to its control electrode 5. Control electrode 5 is connected to a multi-layer diode device 6 of a variable-frequency relaxation oscillator control circuit 7 which applies a gating signal to the control electrode 5 sufficient to initiate conduction in controlled rectifier 4.

Relaxation oscillator control circuit 7 comprises a multi-layer semi-conductor diode device 6. Multi-layer semiconductor diodes are devices well known in the art which exhibit a high impedance at voltages below a minimum switching level and a lower impedance when caused to switch. For example, such devices switch between high voltage, low current states and low voltage, high current states. Preferably diode 6 is one of the commercially available devices known variously in the art as "four-layer diodes" or "shockley diodes" which exhibit an extremely low impedance when switched. Multi-layer diode 6 is connected through a current limiting resistance 8 to a voltage supply, shown schematically as a battery, selected to be higher than the minimum switching voltage of the particular multi-layer diode employed. A capacitance 9 and the emitter-collector circuit of a transistor 10, having an emitter 11, a collector 12 and a base 13, are connected in parallel from the junction of resistance 8 and the multi-layer diode 6 to the other side of the relaxation oscillator voltage supply. Capacitance 9 is of a size to supply sufficient energy to render controlled rectifier 4 conducting. A resistance 14 and diode 15 are connected in series with multi-layer diode device 6 to limit control electrode current and protect the control circuit from high voltage.

In alternating current operation the negative half cycle is operative to render the controlled rectifier nonconducting. For operation of a controlled rectifier system from a direct current supply, however, a commutation circuit means is required to provide this function.

In FIG. 1 the commutation circuit means in accordance with this invention for rendering the controlled rectifier 4 nonconducting is designated generally at 16 and includes rectifying means 17, an inductance 18 and a resonant load capacitance 19 connected in series combination across the load circuit. The anode 20 of a second solid-state controlled rectifier 21 is connected to the junction between inductance 18 and capacitance 19 and the cathode 22 thereof is connected to the cathode 3 of controlled rectifier 4 to provide for the discharge of capacitance 19 into the load. The control electrode 23 of controlled rectifier 21 is connected to the junction between rectifier 17 and inductance 18.

In operation, capacitance 9 charges through current limiting resistance 8 at a rate determined by the value of resistance 8 and the amount of current shunted by transistor 10. The amount of current shunted by transistor 10 is determined by the feed-back signals appearing at the base 13. For example, with no feed-back signals applied, transistor 10 remains nonconducting and maximum power is delivered to the load. When capacitance 9 has acquired sufficient charge so that the voltage difference across multi-layer diode 6 is at the minimum switching level (multi-layer diode 6 is caused to switch from its high to its lower impedance state. The energy stored in capacitance 9 is then applied to the circuit including resistance 14, control electrode 5 and the load is of sufficient magnitude to initiate conduction in controlled rectifier 4. The energy from capacitance 9 is supplied to control electrode 5 until controlled rectifier 4 is rendered conducting at which time the direct current supply voltage is operative to reverse bias multi-layer diode 6 causing it to revert to its high impedance state. Thus, the multi-layer diode device itself serves both to render controlled rectifier 4 conducting and provide a high impedance isolation between control electrode 5 and the direct current network of relaxation oscillator control circuit 7.

When controlled rectifier 4 has been rendered conducting the direct current supply voltage is applied across both the load circuit 1 and the series combination of rectifier 17 and the series resonant circuit consisting of inductance 18 and capacitance 19. Current is conducted in the forward direction for one-half cycle of the resonant frequency of the inductance-capacitance combination. When the current reverses on the other half cycle, a gating signal is applied to control electrode 23 of controlled rectifier 21, since reverse current is blocked by rectifier 17. The energy stored in the resonant load capacitance 19 is essentially twice the value of the supply voltage and this voltage is applied in the forward direction with respect to controlled rectifier 21 to provide forward bias therefor so that application of the gating signal thereto renders it conducting. At the same time the controlled rectifier 4 is rendered nonconducting, since the discharge of resonant load capacitance 19 through controlled rectifier 21 into the load circuit serves to apply a reverse bias to controlled rectifier 4 of approximately the same magnitude as that of the supply voltage. This may be shown more clearly by reference to FIG. 2 showing the voltage appearing at cathode 3.

The time between the initiation of conduction in controlled rectifier 4 and initiation of conduction in controlled rectifier 21, which operates to reverse bias and turn off controlled rectifier 4, is determined by the natural frequency of the series resonant combination of inductance 18 and capacitance 19. Controlled rectifier 4, therefore, is rendered nonconducting a fixed time after the initiation of conduction therein. Since this time is a function only of circuit parameters it is not affected by supply voltage, type of load or load current. Moreover, the gating signal to initiate conduction in the second silicon controlled rectifier 21 is taken from the resonant inductance-capacitance combination itself so that the need for an external gating signal means and its associated timing means is avoided.

In further accord with this invention, power interlocking voltage means are incorporated in the system to render control circuit 7 inoperative until the resonant load capacitance 19 has discharged to a predetermined value thereby preventing the application of a gating signal to control electrode 5 during commutation or during the reapplication of forward voltage to controlled rectifier 4 and assuring maximum commutation system capacity.

Figure 2:
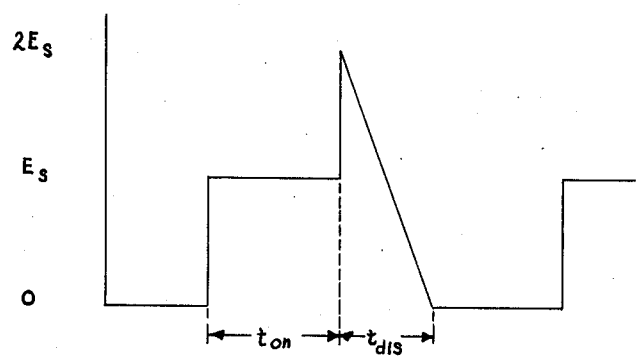
FIG. 2 is a voltage wave shape illustrating the voltage at the cathode of the controlled rectifier; and, FIG. 3 is a complete detailed schematic circuit diagram of a direct current controlled rectifier converter in accordance with this invention.

This is provided by the voltage interlocking means since the voltage shown in FIG. 2 at the cathode 3 also appears in the reverse direction across multi-layer diode 6. Thus, relaxation oscillator 7 is rendered inoperative until the voltage at the cathode 3 is reduced to a value equal to the difference between the relaxation oscillator supply voltage and the minimum switching voltage of multi-layer diode 6. This difference is the minimum power interlocking voltage. Until capacitance 19 discharges to a value sufficient to reduce the cathode 3 to this voltage level, the energy stored in capacitance 9 is never sufficient to cause multi-layer diode 6 to switch to its lower impedance state. The power interlocking voltage means, therefore, assures that there is never the possibility that a gating signal will be applied to control electrode 5 during commutation or reapplication of forward voltage across controlled rectifier 4.

Since control circuit 7 is rendered operative when the voltage at cathode 3 is reduced to the minimum interlocking value, full forward voltage has not yet been reapplied to controlled rectifier 4. However, since the interlocking voltage is kept to a minimum, "substantially" full forward voltage appears across controlled rectifier 4 before control circuit 7 has been rendered conducting. It is this concept which is intended to be conveyed by the use of the term "substantially" with reference to the forward voltage across controlled rectifier 4 in the specification and the appended claims. An important feature of this interlocking means, therefore, is that it provides for the discharge of resonant load capacitance 19 to a predetermined level before allowing for the application of a gating signal to the control electrode of controlled rectifier 4 so that maximum commutation system capacity may be achieved.

FIG. 3 shows a detailed schematic circuit diagram of a complete direct current controlled rectifier converter wherein a direct current voltage of one magnitude is converted to a direct current voltage of a different and regulated magnitude.

The complete direct current converter system shown in FIG. 3 comprises controlled rectifier 4, variable frequency relaxation oscillator control circuit 7 and commutation circuit means 16. The system further includes a filter circuit 25, a voltage control circuit 26 and a current limiting circuit 27.

In FIG. 3 the power supply for control circuit means 7 is provided by a zener-type diode device 28 connected through series resistance 29 across the direct current supply voltage to be converted. Zener-type diode 28 is sufficiently biased by resistance 29 that the power supply provided is essentially independent of the line voltage. Zener-type diode 28 is also selected to insure that the zener voltage thereof is higher than the minimum switching voltage of multi-layer diode device 6 over the operating temperature range. As shown hereinbefore, this voltage difference should be kept small to insure a minimum interlocking voltage. The control electrode of controlled rectifier 4 is protected from over-voltage by zener-type diode 65 connected between control electrode 5 and cathode 3.

The filter circuit 25 is connected in series with the anode 2 and cathode 3 of controlled rectifier 4. The circuit includes inductance 30 and capacitance 31 and output terminal means 32 and 33 for connection to a load circuit, shown schematically as resistance 34. A "free wheeling" diode 35 is associated with the filter circuit 25 and provides a low impedance path through the load to dissipate the energy stored in inductance 30 when controlled rectifiers 4 and 21 are rendered nonconducting.

Filter circuit 25 serves to absorb energy during the time controlled rectifiers 4 and 21 are conducting and transfers this energy to the load when the controlled rectifiers are rendered nonconducting. This energy exchange serves to keep the output voltage approximately free of ripple so that a substantially smooth direct current output is obtained. Moreover, for a fixed load, load current is approximately constant. A capacitance 36, several orders of magnitude smaller and shunting capacitance 31, may be provided to reduce switching transients which may appear in the output.

The voltage control circuit 26 develops a control feedback signal indicative of the deviation in load voltage from the predetermined converted and regulated value. The circuit includes a voltage divider, consisting of fixed resistances 37 and 38 and a potentiometer 39 connected in series across the output terminals 32 and 33. Fixed resistances 37 and 38 determine the minimum and maximum values of load voltage while potentiometer 39 allows for compensation for component values.

Voltage control circuit 26 also includes a reference circuit made up of a zener-type diode device 40 and the base-to-emitter barrier voltage of transistor 10. One terminal of diode 40 is connected in common to the movable tap 41 of potentiometer 39 and the junction between potentiometer 39 and resistance 37. The other terminal is connected over conductor 42 to the base 13 of transistor 10. A diode 43 in series with zener-type diode 40 isolates voltage control circuit 26 from current limiting circuit 27. A leakage path for both transistor 10 and diode 43 is provided by a resistance 44 connected from the junction of the cathode of diode 43 and base 13 to the emitter 11 of transistor 10. Resistance 45 connected from the anode of diode 43 to the other side of resistance 44 provides a bleed path to maintain zener-type diode 40 in its conducting state.

Oscillations at low loads between filter circuit 25 and the reactive elements of commutation circuit 16 are prevented by the series combination of capacitance 46 and resistance 47 connected from the end 48 of inductance 30 to the junction 49 between zener-type diode 40 and conductor 42. Alternatively, such oscillations may be prevented by the use of a diode in series with inductance 30; the anode of such diode being connected to the junction between the two controlled rectifiers 4 and 21.

Current limiting circuit 27 develops a control feed-back signal as well as protecting the system from overloads and limiting the current through inductance 30 when capacitance 31 initially charges. The circuit comprises bias network 50 and a current measuring shunt 51. Bias network 50 includes a voltage divider made up of the series combination of resistances 52, 53 and 54. A diode 55 is connected from the junction of resistances 52 and 53 to the base 13 of transistor 10 and serves as a reference element in the current control loop as well as isolating current limiting circuit 27 from voltage control circuit 26. Since the negative temperature coefficients of the barriers of diode 55 and transistor 10 are in the current measuring loop, it is desirable to provide temperature compensation therefor. This is accomplished by shunting resistance 53 with a thermistor 56 which is a resistance element having a negative temperature coefficient of resistance.

Since the current in bias network 50 should be kept low to minimize self-heating of thermistor 56, resistance 44 providing the leakage path for diode 43 and transistor 10 should be large. Resistance 44, however, must not be so large that the leakage current of transistor 10 and diode 43 is operative to render transistor 10 conducting.

In operation, a direct current supply voltage of one magnitude is connected to the input terminals 60 and 61 of the direct current converter system. When a gating signal from relaxation oscillator control circuit 7 is applied to the control electrode 5, controlled rectifier 4 is rendered conductive and the direct current supply voltage is applied to the filter circuit 25, as well as to the series combination of rectifier 17 and the series resonant elements, inductance 18 and capacitance 19. Current is conducted in the forward direction for one-half cycle of resonant frequency of the series resonant circuit. When the current reverses, a gating signal is applied to the control electrode of controlled rectifier 21 rendering it conductive and allowing the energy stored in resonant load capacitance 19 to discharge through controlled rectifier 21 into the filter circuit 25. At the same time, the energy stored in capacitance 19 is applied to controlled rectifier 4 and to the multi-layer diode device 6 of the control circuit 7. This energy is operative to simultaneously reverse bias controlled rectifier 4 and multilayer diode device 6 rendering controlled rectifier 4 nonconducting and control circuit 7 inoperative. Control circuit 7 remains inoperative by action of the voltage interlocking means until capacitance 19 has discharged to a predetermined level.

The repetition rate of the relaxation oscillator of control circuit 7 which delivers gating pulses to controlled rectifier 4 is controlled by transistor 10. The transistor is controlled by the signals from the load voltage and current measuring circuits 26 and 27 respectively.

Load voltage is measured by the voltage divider made up of series resistances 37 and 38 and potentiometer 39. Any error signals appearing at the voltage divider are compared with the reference voltage of zener-type diode 40 and the resulting signal applied to the base of transistor 10 to adjust the repetition rate of the relaxation oscillator. For example, an increase in load voltage, from the desired regulated and converted value, causes a feed-back signal to be developed which is operative to render transistor 10 conducting thereby decreasing the frequency of the relaxation oscillator of control circuit 7. This decrease in frequency results in a longer delay between the fixed duration conduction periods of controlled rectifier 4 thereby decreasing the power supplied to the load and consequently decreasing the load voltage.

Similarly, load current is measured by the current limiting circuit means 27 and the feed-back signal developed therein applied to the base of transistor 10 to adjust the repetition rate of the relaxation oscillator of control circuit 7. For example, when sufficient load current is present, the voltage of current measuring shunt 51, added to the bias voltage of bias network 50 operates to render transistor 10 conducting and decrease the repetition rate of the relaxation oscillator. Again, a decrease in the repetition rate results in a decrease in load voltage. Further, when the load voltage has been sufficiently reduced, voltage reference zener-type diode device 40 is not conducting and the sole control of transistor 10 is provided by current limiting circuit 27 so that the converter provides essentially a constant current output.

While only certain specific embodiments of our invention have been described, many changes and modifications may be made therein by those skilled in the art without departing from the invention. It is, therefore, to be understood that the appended claims are intended to cover all such changes and modifications as fall within the true spirit and scope of our invention.

What we claim as new and desired to secure by Letters Patent of the United States is:

1. A controlled rectifier system comprising:
  (a) a solid-state controlled rectifier having an anode, a cathode and a control electrode; a load circuit;
  (b) means for connecting said load circuit and the anode-cathode elements of said controlled rectifier in series with a source of direct current voltage;
  (c) means for applying a gating signal to said control electrode operative to initiate conduction in said controlled rectifier;
  (d) and commutation circuit means operative to render said controlled rectifier nonconducting a fixed time after initiation of conduction therein, said means including a series resonant inductance-capacitance circuit, means for energizing said series resonant circuit upon initiation of conduction in said controlled rectifier, a second controlled rectifier adapted to be rendered conductive by the energy stored in said capacitance for discharging said capacitance into said load circuit operative to reverse bias said first controlled rectifier.

2. In a controlled rectifier system including a solid-state controlled rectifier having an anode, a cathode and a control electrode; a load circuit; means for connecting said load circuit and the anode-cathode elements of said controlled rectifier in series with a source of direct current voltage, and means for applying a gating signal to said control electrode operative to initiate conduction in said controlled rectifier, the combination with said system comprising: commutating circuit means operative to render said controlled rectifier nonconducting a fixed time after initiation of conduction therein, said means including the series combination of rectifying means and a series resonant inductance-capacitance circuit shunting said load circuit, a second solid-state controlled rectifier having an anode, a cathode and a control electrode adapted for discharging said capacitance into said load circuit and reverse biasing said first controlled rectifier, and means for applying the energy stored in said capacitance to said control electrode to initiate conduction in said second controlled rectifier at a time after initiation of conduction in said first controlled rectifier determined by the resonant frequency of said series resonant circuit.

3. In a controlled rectifier system comprising a solid-state controlled rectifier having an anode, a cathode and a control electrode; a load circuit; means for connecting said load circuit and the anode-cathode elements of said controlled rectifier in series with a direct current voltage source; commutating circuit means for rendering said controlled rectifier nonconducting a fixed time after initiation of conduction therein; and means for applying a gating signal directly to said control electrode of sufficient amplitude to initiate conduction in said controlled rectifier, said means comprising a voltage supply, a multi-layer semiconductor diode device connected between said voltage supply and said control electrode, means including a resistance-capacitance combination and said voltage supply for causing said multi-layer diode device to switch from a high to a lower impedance state producing an output at said control electrode sufficient to initiate conduction in said controlled rectifier, the conduction of said controlled rectifier being operative to reverse bias said multi-layer diode device, and means for varying the repetition rate of switching of said diode device.

4. The controlled rectifier system of claim 3 wherein said multi-layer semiconductor diode device is a four-layer diode.

5. A controlled rectifier system comprising:
(a) a solid-state controlled rectifier having an anode, a cathode and a control electrode;
(b) a load circuit;
(c) means for connecting said load circuit and the anode-cathode elements of said controlled rectifier in series with a direct current voltage source;
(d) relaxation oscillator circuit means including a multi-layer semiconductor diode device operative to apply a gating signal directly to said control electrode to initiate conduction in said controlled rectifier and provide a high impedance isolation between said control electrode and the direct current network of said relaxation oscillator;
(e) commutation circuit means including a second solid-state controlled rectifier, a series combination of rectifying means and a series resonant inductance-capacitance circuit shunting said load circuit, and means for applying the energy stored in said capacitance to initiate conduction in said second controlled rectifier so that said capacitance is discharged through the anode-cathode path thereof into said load circuit and reverse biases said first controlled rectifier terminating conduction therein at a time after initiation of conduction determined by the frequency of said series resonant circuit;
(f) and power interlocking means applying the energy stored in said capacitance to said multi-layer diode and to said first controlled rectifier to render said relaxation oscillator inoperative until said capacitance discharges to a predetermined level.

6. A controlled rectifier system comprising:
(a) a solid-state controlled rectifier having an anode, a cathode and a control electrode;
(b) means for connecting the anode-cathode elements of said controlled rectifier in series with a load circuit and a source of direct current voltage;
(c) control circuit means comprising a variable-frequency relaxation oscillator circuit including a multi-layer semiconductor diode device which is operative to apply a gating signal directly to said control electrode sufficient to initiate conduction in said controlled rectifier;
(d) commutation circuit means shunting said load circuit including a resonant load capacitance, a second solid-state controlled rectifier for discharging said capacitance into said load circuit and reverse biasing said first controlled rectifier, and means for applying the energy stored in said resonant load capacitance to the control electrode of said second controlled rectifier operative to initiate conduction therein a fixed time after initiation of conduction in said first controlled rectifier;
(e) and voltage interlocking means simultaneously applying the energy stored in said resonant load capacitance to the cathode of said first controlled rectifier and to said multi-layer diode device to prevent application of a gating signal to said first controlled rectifier until said resonant load capacitance discharges to a predetermined level.

7. The controlled rectifier system of claim 6 wherein said multi-layer semiconductor diode device is a four-layer diode.

8. A controlled rectifier direct current converter system comprising:
(a) a solid-state controlled rectifier having an anode, a cathode and a control electrode;
(b) means for connecting the anode-cathode elements of said controlled rectifier to a source of direct current voltage;
(c) control circuit means comprising a variable-frequency relaxation oscillator circuit including a multi-layer semiconductor diode device, said device being operative to apply a gating signal directly to said control electrode sufficient to initiate conduction in said controlled rectifier and provide a high impedance isolation between said control electrode and the direct current network of said relaxation oscillator circuit;
(d) filter circuit means in series with the anode-cathode elements of said first controlled rectifier and including output terminal means for connection of a load circuit to said system;
(e) communication circuit means shunting said filter circuit and including a resonant load capacitance, a second solid-state controlled rectifier arranged and adapted for discharging said capacitance into said filter circuit, and means for applying the energy stored in said capacitance to the control electrode of said second controlled rectifier operative to initiate conduction therein a fixed time after the initiation of conduction in said first controlled rectifier;
(f) voltage interlocking means simultaneously applying the energy stored in said resonant load capacitance to said first controlled rectifier and to said multi-layer diode device to prevent application of a gating signal to the control electrode of said first controlled rectifier until said resonant load capacitance has discharged to a predetermined level;

(g) first and second circuit means responsive respectively to the deviation in load current and voltage from a preset value for developing control feed-back signals indicative of such deviation;

(h) and means for applying said feed-back signals to said relaxation oscillator control circuit operative to vary the repetition rate thereof and the average power supplied to said load circuit.

9. The controlled rectifier system of claim 8 wherein the multi-layer semiconductor diode device is a four-layer diode.

10. In a controlled rectifier system including a solid-state controlled rectifier having an anode, a cathode and a control electrode; a load circuit; means for connecting said load circuit and the anode-cathode elements of said controlled rectifier in series with a source of direct current voltage; and means for applying a gating signal to said control electrode operative to initiate conduction in said controlled rectifier, the combination with said system of commutation circuit means operative to terminate conduction in said controlled rectifier a fixed time after initiation of conduction therein comprising:

(a) the series combination of a rectifying device and a series resonant inductance-capacitance combination shunting said load circuit;

(b) a second solid-state controlled rectifier having an anode, a cathode and a control electrode;

(c) means connecting said anode to the junction between said inductance and capacitance;

(d) means connecting said control electrode to the junction between said inductance and said rectifying device;

(e) and means connecting said cathode to the cathode of said first controlled rectifier so that the energy stored in said capacitance is operative to initiate conduction in said controlled rectifier thereby discharging said capacitance into said load circuit to reverse bias and terminate conduction in said first controlled rectifier.

No references cited.

LLOYD McCOLLUM, *Primary Examiner.*

UNITED STATES PATENT OFFICE
CERTIFICATE OF CORRECTION

Patent No. 3,192,468

June 29, 1965

James L. Buchanan et al.

It is hereby certified that error appears in the above numbered patent requiring correction and that the said Letters Patent should read as corrected below.

Column 8, line 64, for "communication" read -- commutation --.

Signed and sealed this 16th day of November 1965.

(SEAL)
Attest:

ERNEST W. SWIDER
Attesting Officer

EDWARD J. BRENNER
Commissioner of Patents